United States Patent Office 2,857,344
Patented Oct. 21, 1958

2,857,344

COATING COMPOSITIONS COMPRISING AN OIL MODIFIED ALKYD RESIN AND NITROCELLULOSE

Aloysius N. Walus, Flint, Mich., assignor to E. I. du Pont de Nemours and Company, Wilmington, Del., a corporation of Delaware No Drawing. Application November 26, 1956
Serial No. 624,210

7 Claims. (Cl. 260—16)

This invention relates to pigmented lacquers containing nitrocellulose and oil-modified alkyd resin, and particularly to improving their outdoor durability.

Lacquers containing nitrocellulose and oil-modified alkyd resin as the principal organic film-forming components are required to have several desirable properties simultaneously. One important property of such lacquers used on automobile bodies is resistance to dulling or loss of the original high gloss during prolonged outdoor exposure. Another is hardness, which permits the lacquer to withstand marring and scratching. Another is freedom from thermoplasticity, i. e. susceptibility to being marked or disfigured while in a relatively soft condition resulting from being warm or hot, as the lacquer is likely to be in the summer sun. Others include resistance to cracking resulting from temperature changes, resistance to staining by tar and grease, adhesion to the substrate which is coated, protection of the substrate from rusting or other weathering effects, and ability of a freshly applied coating to dry at atmospheric or moderately elevated temperatures. It is known in the nitrocellulose lacquer art that a change in composition which yields an improvement in one desirable property is usually accompanied by a sacrifice in another desirable property.

The principal objective of this invention is to improve the outdoor durability of pigmented nitrocellulose/oil-modified alkyd resin lacquers without sacrificing other essential or desirable properties.

In accomplishing this objective, it has been determined that the alkyd resin is the critical component. The alkyd resins used in prior art nitrocellulose lacquers are modified with coconut oil, castor oil, linseed oil, soya oil, dehydrated castor oil, or the like, or with the corresponding fatty acids. Substituting one alkyd resin of this type for another in prior art nitrocellulose lacquers fails to yield improved durability without sacrificing one or more of the required properties. Changes in the amount of oil modification and changes in the proportions of nitrocellulose and alkyd resin fail likewise.

The problem defined by the principal objective of this invention is solved by using, as the alkyd resin component, a particular class of coconut oil- or coconut oil fatty acid-modified alkyd resin which has been copolymerized with a specific amount of butyl methacrylate.

More specifically, the principal objective of this invention, i. e. pigmented nitrocellulose/oil-modified alkyd resin lacquers having improved outdoor durability, is accomplished by providing a liquid coating composition comprising pigment, volatile organic solvent, and organic film-forming material consisting essentially of (1) a butyl methacrylate-alkyd resin copolymer containing, in each 100 parts by weight thereof, (a) 20–60 parts by weight of butyl methacrylate and (b) 80–40 parts by weight of a phthalic glyceride alkyd resin having an acid number less than 10 and containing chemically combined therein 40%–55% of a member of the class consisting of coconut oil and coconut oil fatty acids, 1%–8% of maleic anhydride, and unesterified hydroxyl groups in an amount equivalent to 0.4%–10.2% of glycerine, the percentages being by weight based on said alkyd resin, and (2) lacquer-grade nitrocellulose, the weight ratio of said copolymer to said nitrocellulose being between 1:1 and 3:1.

It is to be understood that other polymerizable vinyl compounds containing the same functional group ($CH_2=C<$) as butyl methacrylate, such as methyl or ethyl methacrylate, the lower alkyl acrylates and styrene, are not equivalents of butyl methacrylate in this invention. Lacquers derived from such other compounds by procedures analogous to those described in this invention are deficient in durability, adhesion, gasoline resistance or other important properties.

Taking, as the basis for description, 100 parts by weight of the butyl methacrylate-alkyd resin copolymer described above, this copolymer should be based on a polymerization mixture containing 20–60 parts by weight of butyl methacrylate, the balance (80–40 parts, respectively) being an oil-modified alkyd resin as defined. This defines copolymer containing copolymerized butyl methacrylate and alkyd resin in respective weight ratios between 20:80 and 60:40, inclusive. Examples of useful intermediate ratios within this range are 25:75, 40:60 and 50:50.

When the butyl methacrylate content of the above-defined copolymer is below 20 parts by weight in 100 parts of copolymer, the lacquer coatings derived therefrom are too thermoplastic to provide acceptable resistance to marking or disfiguring while at elevated temperatures during service. When the butyl methacrylate content is above 60 parts by weight in 100 parts of copolymer, the lacquer coatings are not acceptable in resistance to softening by liquid hydrocarbons such as gasoline. For the best balance of properties in the lacquer coatings, the preferred proportions of butyl methacrylate and alkyd resin in 100 parts by weight of copolymer are 30–50 parts of butyl methacrylate and 70–50 parts of alkyd resin respectively. These preferred proportions can be expressed as a weight ratio of butyl methacrylate to alkyd resin within the range of 30:70 to 50:50.

The butyl methacrylate and alkyd resin are copolymerized by subjecting a mixture of butyl methacrylate monomer or low polymer and alkyd resin, preferably in solution in a mutual solvent, to conditions conducive to vinyl addition polymerization. It is believed that butyl methacrylate monomer and/or chains of butyl methacrylate polymer are thereby attached to the alkyd resin through the polymerizable $CH_2=C<$ group which exists in butyl methacrylate and in the maleic acid groups in the alkyd resin. It is possible that some unattached butyl methacrylate homopolymer also evolves. Heating the polymerizable components together at a moderate temperature in the presence of a small amount (e. g. 0.1–3.0% of the components) of a polymerization catalyst is a preferred method of preparing the copolymers. Examples of several classes of suitable catalysts are benzoyl peroxide, tertiarybutyl hydroperoxide, tertiarybutyl perbenzoate, azobisisobutyronitrile, and benzene phosphonous acid. Ditertiarybutyl peroxide is a preferred catalyst.

The amount of coconut oil or equivalent coconut oil fatty acid used in preparing the alkyd resin should be between 40% and 55% of the weight of the resin, based on calculation as coconut oil (coconut oil fatty acid glyceride). Below 40% oil or equivalent oil acid content, the alkyd resins tend to be brittle, and the lacquer coatings ultimately derived therefrom lack the flexibility required especially for use on automobile bodies. Above 55% oil or equivalent oil acid content, the alkyd resins yield lacquers having unacceptable resistance to staining from tar and grease. For the best balance of properties in the lacquer coatings, the preferred amount of coconut oil or coconut oil fatty acid is 45%–50% of the weight of the alkyd resin.

Furthermore, maleic anhydride should be present among the reagents used in making the alkyd resin to the extent of 1%–8% of the weight of the resin. Obviously a chemically equivalent amount of maleic acid can be used in place of maleic anhydride. The specified percentages are based on calculation as maleic anhydride. When substantially less than 1% is used, the amount of butyl methacrylate which can be copolymerized with the resulting alkyd resin is not enough to yield the improvement claimed herein. When substantially more than 8% of maleic component is used, the resulting resins tend to gel during preparation or during copolymerization with butyl methacrylate and become useless in this invention. The preferred amount of maleic anhydride is 3%–7% of the weight of the alkyd resin.

The amounts of glycerine (or other polyhydric alcohol, e. g. pentaerythritol) and phthalic anhydride (or other dicarboxylic acid, e. g. isophthalic acid) used in making the alkyd resin are such that the polyhydric alcohol is present in an amount exceeding that required stoichiometrically to yield a neutral alkyd resin (complex polyester reaction product) from the acid- and hydroxyl-contributing reagents. The alkyd resins should contain unesterified hydroxyl (—OH) groups, which result from such excess polyhydric alcohol, in an amount stochiometrically equivalent to 0.4%–10.2% by weight of glycerine based on the weight of the resin (three hydroxyl groups being equivalent to one mol of glycerine). In conjunction with the above-specified proportions of the other reagents, this amount of unreacted hydroxyl defines alkyd resins which, when copolymerized with butyl methacrylate, yield the nitrocellulose-compatible copolymers essential in this invention. The preferred amount of unesterified hydroxyl groups is that amount equivalent to 2%–7% of glycerine, based on the weight of the alkyd resin.

A final requirement of the alkyd resins from which the copolymers essential in this invention can be made is that the alkyd resin solids have an acid number below 10. It is known to alkyd resin chemists, and it applies here, that resins having an acid number of zero are theoretically possible, but it is common practice not to continue the alkyd resin reaction below an acid number of 1 or 2 because of the long and/or cumbersome process involved. The acid number of the alkyd resins useful in this invention should be below 10 to prevent or minimize blistering in the lacquer coatings during service and to minimize undesirable acid-induced side reactions among the components of the liquid lacquer. The preferred acid number of the alkyd resin solids is 3–7.

The lacquer-grade nitrocellulose used in the coating compositions of this invention can be any of the wide variety commonly employed in nitrocellulose lacquers. The most common characteristic used to define these is viscosity. The most widely used grades have viscosities of one-quarter second to five seconds. These are the most useful grades for this invention although mixtures containing small proportions of grades having viscosities as high as fifty or one hundred seconds can also be used. The one-quarter second viscosity corresponds to about 50 centipoises when measured as a 12.2 percent solution in the solvent mixture defined as Formula A in ASTM-D301–54T. On the same basis, five seconds corresponds to about 1800 centipoises, fifty seconds to about 18,000 centipoises, and one hundred seconds to about 38,000 centipoises. A particularly preferred range for use in this invention is between one second and three seconds (400–1200 centipoises).

The amount of nitrocellulose used in the lacquers of this invention is directly related to the amount of butyl methacrylate-alkyd resin copolymer. The weight ratio of the copolymer to the nitrocellulose should be between 1:1 and 3:1, inclusive. When more nitrocellulose than the 50% maximum defined in the 1:1 ratio is used, the improved durability claimed in this invention is not obtained. When less nitrocellulose than the 25% minimum defined in the 3:1 ratio is used, the resulting lacquer coatings have unacceptable hardness, mar resistance, gasoline resistance and/or resistance to cracking resulting from temperature changes. For the best balance of properties in the lacquer coatings, the preferred weight ratio of copolymer to nitrocellulose is between about 1.5:1 and 2.5:1.

The lacquers of this invention are pigmented for reinforcing, protecting and decorating purposes. Any of the pigments or combinations thereof which are commonly used in lacquers can be used in the products of this invention. Examples include metal oxides, hydroxides, chromates, silicates, sulfides, sulfates, and carbonates, carbon blacks, organic dyestuffs and lakes thereof, and metal flake pigments like aluminum. The amounts used vary with the purpose according to principles known to those skilled in the lacquer art. The pigments are dispersed in the lacquers by any of the well-known grinding or dispersion methods, e. g. ball, stone, pebble, roller mills.

The solvents used in the lacquers of this invention are those commonly used in the nitrocellulose lacquer art. Such solvents are usually blends of such organic liquids as esters, ketones, alcohols, aliphatic hydrocarbons and aromatic hydrocarbons.

Although conventional lacquer modifiers are not essential components of the new lacquers of this invention, they can be used in small proportions in accordance with principles known to those skilled in the lacquer art. Such modifiers include plasticizers, hardeners, driers, accelerators, inhibitors, dispersing agents, surface active agents, and organic film-forming materials other than the above-described copolymers and nitrocellulose.

The products of this invention can be applied by well-known means such as spraying, dipping and brushing. Spraying is preferred. They can be air dried at normal painting temperatures or can be force dried at elevated temperatures, such as 100°–200° F.

The following examples are provided to illustrate the principles and practice of this invention, but its scope is not intended to be limited thereby. Unless otherwise specified, the parts and percentages are expressed by weight.

EXAMPLE 1

*Preparation of 50% coconut oil modified alkyd resin*

A 50% coconut oil modified alkyd resin for use in this invention is prepared by placing 1500 parts by weight of coconut oil and 428 parts of glycerine in a closed resin kettle equipped with a thermometer, agitator and reflux condenser with water trap. The charge is heated to 300° F. Then 1 part of litharge is added, and the charge is heated to 450° F. and is held at this temperature for about 45 minutes (a sample of the charge forms a clear 30% solution in methanol). Then 991 parts of phthalic anhydride and 96 parts of maleic anhydride are added. When these have melted, 125 parts of xylene and 130 parts of glycerine are added to the charge, and the water trap in the condenser is filled with xylene. The charge is refluxed at 400°–450° F., and water is removed until the resin solids have an acid number of about 5. This requires about 7 hours. Heating is discontinued, and 1875 parts of xylene are added.

The resulting alkyd resin solution contains about 60% solids and has a Gardner-Holdt viscosity of about M at room temperature. By calculation, the resin solids contain, in the form of a complex polyester reaction product, 50% coconut oil (coconut oil fatty acid glyceride), 4.6% maleic glyceride (equivalent to 3.2% maleic anhydride), unesterified hydroxyl groups equivalent to 2.7% of glycerine, and 42.7% phthalic glyceride.

*Preparation of butyl methacrylate-alkyd resin copolymer*
*(40:60)*

A copolymer of butyl methacrylate and the alkyd resin prepared above is made by placing 620 parts by weight of this 60% alkyd resin solution and 164 parts of xylene in a closed polymerization vessel equipped with a thermometer, agitator and reflux condenser. This charge is heated to its reflux temperature, about 280° F. Then a mixture of 248 parts of butyl methacrylate monomer and 6 parts of ditertiarybutyl peroxide (about 1% based on the weight of alkyd resin plus butyl methacrylate) is added dropwise during a period of about one hour. The charge is then held at its reflux temperature, about 280°–285° F., for about 6.5 hours, at which point heating is discontinued and the charge is permitted to cool to room temperature.

The resulting clear solution contains 58.9% solids and has a Gardner-Holdt viscosity of about T. The copolymer solids contain 40% butyl methacrylate and 60% alkyd resin.

*Preparation of lacquer*

A white lacquer of this invention having the following formula is prepared by grinding the pigment with a portion of the copolymer solution to produce a smooth dispersion and mixing the resulting dispersion with the remaining ingredients:

| | Parts by weight |
|---|---|
| Copolymer solution prepared above | 146 |
| Nitrocellulose solution (23% of 1.3 second viscosity nitrocellulose in lacquer solvent) | 186 |
| Titanium dioxide pigment | 39 |
| Lacquer solvent | 29 |
| | 400 |

The lacquer solvent in this composition is a mixture having the following formula:

| | Parts by weight |
|---|---|
| Ethylene glycol monoethyl ether acetate | 16 |
| Methyl ethyl ketone | 20 |
| Methyl amyl acetate | 20 |
| Methyl isobutyl ketone | 24 |
| Isopropyl alcohol | 7 |
| Toluene | 13 |
| | 100 |

From the ingredients and their proportions used in this pigmented lacquer, it is seen that it contains a 40:60 butyl methacrylate-alkyd resin copolymer, that the phthalic glyceride type alkyd resin the copolymer has an acid number of 5 and contains 50% of chemically combined coconut oil, 3.2% of maleic anhydride, and unesterified hydroxyl groups equivalent to 2.7% of glycerine, and that the ratio of copolymer to nitrocellulose is about 2:1.

The properties of a coating of this lacquer are compared with several analogous prior art nitrocellulose lacquers containing, respectively, alkyd resins modified solely with various non-drying oils and drying oils. All of the lacquers are thinned to spraying consistency with lacquer solvent and are sprayed on primed steel test panels. The panels are force dried by heating at 180° F. for 20 minutes. The dry lacquer coating thickness is about 2 mils. After cooling to room temperature, the coatings are buffed to a high gloss in a conventional manner. All coatings have a gloss rating of the order of 90 (60° gloss measurement, ASTM-D523-53T).

One set of test panels is exposed to the weather in Florida. After nine months, all of the coatings are still continuous, intact and adherent, but all of the prior art coatings have become very dull through loss of gloss (ratings of the order of 20–30), whereas the new coating of this example has remained quite glossy (rating of 70).

The practical significance of this difference is that the new coating of this example, illustrating this invention, is considerably more durable than the prior art coatings in that it resists more effectively the gloss-destroying effects of the sun and the weather. Automobiles lacquered with products of this invention remain bright and glossy much longer than automobiles lacquered with prior art products. Thus, they look better longer and require less frequent and less strenuous polishing to retain a pleasing appearance.

Other sets of the test panels prepared above are compared for the important properties of hardness, thermoplasticity, cracking resistance, staining resistance, adhesion and application properties. In all of these tests, the coating of this example is equal or superior to the prior art coatings. Thus the product of this example accomplishes the objective of this invention by having improved durability without sacrificing any other important property.

The following Examples 2–5 describe other lacquers which, when tested and compared with analogous prior art lacquers as in Example 1, likewise accomplish the objective of this invention.

EXAMPLE 2

The lacquer preparation of Example 1 is repeated in all respects except that 366 parts by weight of a 23.5% solution of one-half second viscosity nitrocellulose and 52 parts of titanium dioxide pigment are substituted for the corresponding components shown in the lacquer formula in that example. The weight ratio of copolymer to nitrocellulose is 1:1 in the resulting lacquer.

EXAMPLE 3

The lacquer preparation of Example 1 is repeated in all respects except that 169 parts by weight of a 17% solution of 3 second viscosity nitrocellulose are substituted for the 186 parts of nitrocellulose solution shown in the lacquer formula in that example. The weight ratio of copolymer to nitrocellulose is 3:1 in the resulting lacquer.

EXAMPLE 4

*Preparation of 45% coconut oil modified alkyd resin*

A 45% coconut oil modified alkyd resin for use in this invention is prepared by following the procedure described in Example 1 and by using the following proportions of ingredients:

| | Parts by weight |
|---|---|
| Coconut oil | 1215 |
| Glycerine (first addition) | 342 |
| Litharge | 1 |
| Phthalic anhydride | 793 |
| Maleic anhydride | 187 |
| Toluene (first addition) | 83 |
| Glycerine (second addition) | 300 |
| Toluene (second addition) | 1372 |

The charge is cooked to an acid number of 3.7 on the resin solids, and the cooking time is about 7.5 hours.

The resulting alkyd resin solution contains about 65% solids and has a Gardner-Holdt viscosity of about U at room temperature. By calculation, the resin solids contain, in the form of a complex polyester reaction product, 45% coconut oil, 10% maleic glyceride (equivalent to 6.94% maleic anhydride), unesterified hydroxyl groups equivalent to 7% glycerine, and 38% phthalic glyceride.

*Preparation of butyl methacrylate-alkyd resin copolymer*
*(20:80)*

A copolymer of butyl methacrylate and the 45% coconut oil modified alkyd resin prepared directly above in this example is prepared by following the copolymerization procedure described in Example 1 and by using the following proportions of ingredients:

| | Parts by weight |
|---|---|
| 45% coconut oil modified alkyd resin solution prepared above | 572 |
| Xylene | 103 |
| Butyl methacrylate monomer | 93 |
| Ditertiarybutyl peroxide | 7 |

The reflux temperature of this charge is 260°–265° F. and the cooking time is about 6 hours.

The resulting clear solution contains about 59% solids and has a Gardner-Holdt viscosity of about X. The copolymer solids contain 20% butyl methacrylate and 80% alkyd resin.

Preparation of lacquer

A black lacquer of this invention having the following formula is prepared by the lacquer-making procedure described in Example 1:

| | Parts by weight |
|---|---|
| 20:80 copolymer solution prepared above | 268 |
| Nitrocellulose solution (20% of 2 second viscosity nitrocellulose in lacquer solvent) | 395 |
| Carbon black pigment | 14 |
| Lacquer solvent | 323 |
| | 1000 |

The lacquer solvent in this composition is a mixture, like that used in Example 1, of esters, ketones, alcohols and hydrocarbons.

From the ingredients and their proportions used in this pigmented lacquer, it is seen that it contains a 20:80 butyl methacrylate-alkyd resin copolymer, that the phthalic glyceride type alkyd resin in the copolymer has an acid number of 3.7 and contains 45% of chemically combined coconut oil, 6.94% of maleic anhydride, and unesterified hydroxyl groups equivalent to 7% of glycerine, and that the ratio of copolymer to nitrocellulose is about 2:1.

EXAMPLE 5

*Preparation of butyl methacrylate-alkyd resin copolymer (50:50)*

A copolymer of butyl methacrylate and the 50% coconut oil modified alkyd resin prepared in Example 1 is prepared by following the copolymerization procedure of Example 1 and by using the following proportions of ingredients:

| | Parts by weight |
|---|---|
| 50% coconut oil modified alkyd resin solution prepared in Example 1 | 620 |
| Xylene | 248 |
| Butyl methacrylate monomer | 372 |
| Ditertiarybutyl peroxide | 11 |

The resulting clear solution contains about 58% solids and has a Gardner-Holdt viscosity of about T. The copolymer solids contain 50% butyl methacrylate and 50% alkyd resin.

Preparation of lacquer

A blue lacquer of this invention having the following formula is prepared by the lacquer-making procedure described in Example 1:

| | Parts by weight |
|---|---|
| 50:50 copolymer solution prepared above | 148 |
| Nitrocellulose solution used in Example 1 (23% solids) | 186 |
| Phthalocyanine blue pigment | 3 |
| Titanium dioxide pigment | 36 |
| Lacquer solvent used in Example 1 | 41 |
| | 414 |

From the ingredients and their proportions used in this pigmented lacquer, it is seen that it contains a 50:50 butyl methacrylate-alkyd resin copolymer, that the phthalic glyceride type alkyd resin in the copolymer has an acid number of 5 and contains 50% of chemically combined coconut oil, 3.2% of maelic anhydride, and unesterified hydroxyl groups equivalent to 2.7% of glycerine, and that the ratio of copolymer to nitrocellulose is about 2:1.

EXAMPLES 6–18

The following table shows the compositions of thirteen additional alkyd resins which have the characteristics required in this invention. All have an acid number less than 10. All can be copolymerized with butyl methacrylate in the proportions and by the techniques previously described. The resulting copolymers can be substituted for all or part of the copolymers used in the foregoing illustrative examples. Likewise, the resulting copolymers can be used in other lacquers prepared in accordance with this invention.

TABLE I.—COCONUT OIL MODIFIED ALKYD RESINS FOR COPOLYMERIZATION WITH BUTYL METHACRYLATE

| Example No | 6 | 7 | 8 | 9 | 10 | 11 | 12 | 13 | 14 | 15 | 16 | 17 | 18 |
|---|---|---|---|---|---|---|---|---|---|---|---|---|---|
| Percent coconut oil or coconut oil fatty acid | 40.0 | 40.0 | 40.0 | 40.0 | 45.0 | 45.0 | 45.0 | 50.0 | 50.0 | 50.0 | 55.0 | 55.0 | 55.0 |
| Percent maleic glyceride* | 11.4 | 10.1 | 4.8 | 3.8 | 9.4 | 4.5 | 3.5 | 8.7 | 7.1 | 3.3 | 8.1 | 2.9 | 1.7 |
| Percent glycerine equivalent to unreacted hydroxyl groups | 10.2 | 8.9 | 6.1 | 5.4 | 7.6 | 4.7 | 3.7 | 6.0 | 4.7 | 2.6 | 4.2 | 1.0 | 0.4 |
| Percent phthalic glyceride | 38.4 | 41.0 | 49.1 | 50.8 | 38.0 | 45.8 | 47.8 | 35.3 | 38.2 | 44.1 | 32.7 | 41.1 | 42.9 |
| Total | 100.0 | 100.0 | 100.0 | 100.0 | 100.0 | 100.0 | 100.0 | 100.0 | 100.0 | 100.0 | 100.0 | 100.0 | 100.0 |
| *Equivalent percent maleic anhydride | 7.9 | 7.0 | 3.3 | 2.6 | 6.5 | 3.1 | 2.4 | 6.0 | 4.9 | 2.3 | 5.6 | 2.0 | 1.2 |

The lacquers of this invention are useful for coating wood, metal and other type articles. They are particularly useful for coating suitably primed automobile bodies, which are used outdoors under severe weather conditions. The lacquers of this invention provide coatings which are more durable than prior art nitrocellulose/alkyd resin lacquers without sacrificing other important properties.

Many widely different embodiments of this invention can be made without departing from the spirit and scope thereof. Therefore, it is not intended to be limited except in accordance with the appended claims.

I claim:

1. A liquid coating composition comprising pigment, volatile organic solvent, and organic film-forming material consisting essentially of (1) a butyl methacrylate-alkyd resin copolymer containing, in each 100 parts by weight thereof, (a) 20–60 parts by weight of butyl methacrylate and (b) 80–40 parts by weight of a phthalic glyceride alkyd resin having an acid number less than 10 and containing chemically combined therein 40%–55% of a member of the class consisting of coconut oil and coconut oil fatty acids, 1%–8% of maleic anhydride, and unesterified hydroxyl groups in an amount equivalent to 0.4%–10.2% of glycerine, the percentages being by weight based on said alkyd resin, and (2) lacquer-grade nitrocellulose, the weight ratio of said copolymer to said nitrocellulose being between 1:1 and 3:1.

2. A product of claim 1 in which said copolymer is a copolymer of 30–50 parts by weight of butyl methacrylate and 70–50 parts by weight of said alkyd resin.

3. A product of claim 1 in which said alkyd resin contains chemically combined therein 45%–50% by weight of a member of the class consisting of coconut oil and coconut oil fatty acids.

4. A product of claim 1 in which said alkyd resin contains chemically combined therein 3%–7% by weight of maleic anhydride.

5. A product of claim 1 in which said alkyd resin contains chemically combined therein unesterified hydroxyl groups equivalent to 2%–7% by weight of glycerine.

6. A product of claim 1 in which the weight ratio of said copolymer to nitrocellulose is between 1.5:1 and 2.5:1.

7. A liquid coating composition comprising pigment, volatile organic solvent, and organic film-forming material consisting of (1) a copolymer of (a) 40 parts by weight of butyl methacrylate and (b) 60 parts by weight of a phthalic glyceride alkyd resin having an acid number of about 5 and containing chemically combined therein 50% by weight of coconut oil, 3.2% by weight of maleic anhydride, and unesterified hydroxyl groups equivalent to 2.7% by weight of glycerine, and (2) lacquer grade nitrocellulose, the weight ratio of said copolymer to said nitrocellulose being 2:1.

References Cited in the file of this patent

UNITED STATES PATENTS

| | | |
|---|---|---|
| 2,214,127 | Ensminger | Sept. 10, 1940 |
| 2,498,091 | Moffett | Feb. 21, 1950 |